May 27, 1930.  W. E. LAGERFELDT  1,759,860
SPRING TRACTOR WHEEL
Filed May 18, 1929  3 Sheets-Sheet 1

Inventor
W. E. Lagerfeldt
By Clarence A. O'Brien
Attorney

May 27, 1930.  W. E. LAGERFELDT  1,759,860
SPRING TRACTOR WHEEL
Filed May 18, 1929    3 Sheets-Sheet 2

Inventor
W. E. Lagerfeldt

By Clarence A. O'Brien
Attorney

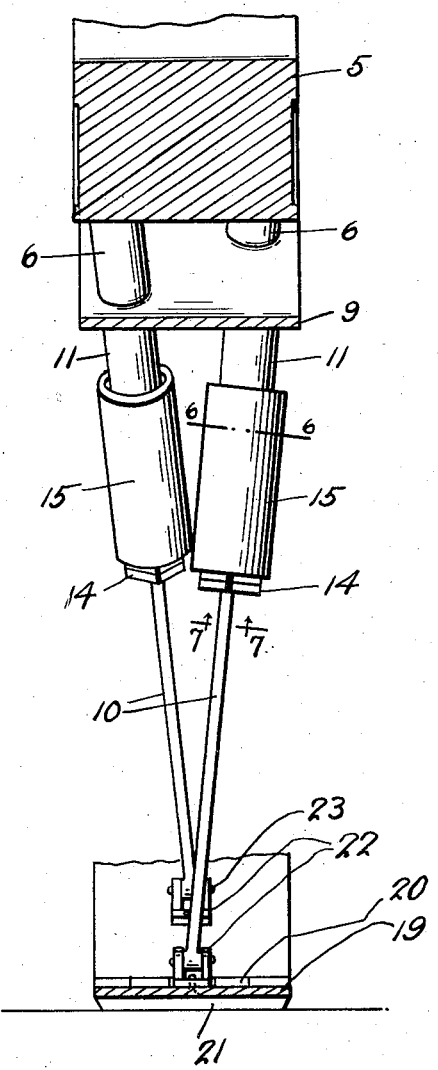
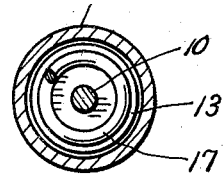
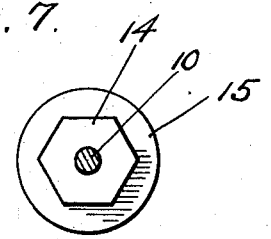

Patented May 27, 1930

1,759,860

UNITED STATES PATENT OFFICE

WILFRED EMANUEL LAGERFELDT, OF IRON MOUNTAIN, MICHIGAN

SPRING TRACTOR WHEEL

Application filed May 18, 1929. Serial No. 364,090.

The present invention appertains to new and useful improvement in vehicle wheels and more particularly to a spring wheel especially adapted for use on tractors.

The principal object of this invention is to provide a spring tractor wheel which has exceptional traction increased qualities.

Another object of the invention is to provide a tractor wheel which, in operation, will not tend to cut into the earth, thus eliminating the usual gauging and dirt digging antics of tractor wheels now in use.

Another important object is in the provision of a tractor wheel which will easily ride out of soft ground without spinning or digging thereinto.

After considering the following specification and claim, other very important objects and advantages of the invention will readily become apparent.

In the drawings:

Figure 4 represents a fragmentary vertical sectional view, taken on a plane at right angles to the sectional view in Figure 3.

Figure 6 represents a cross sectional view of the spring means, taken substantially on the line 6—6 of Figure 4.

Figure 7 represents a cross sectional view taken substantially on the line 7—7 of Fig. 4.

Figure 1:
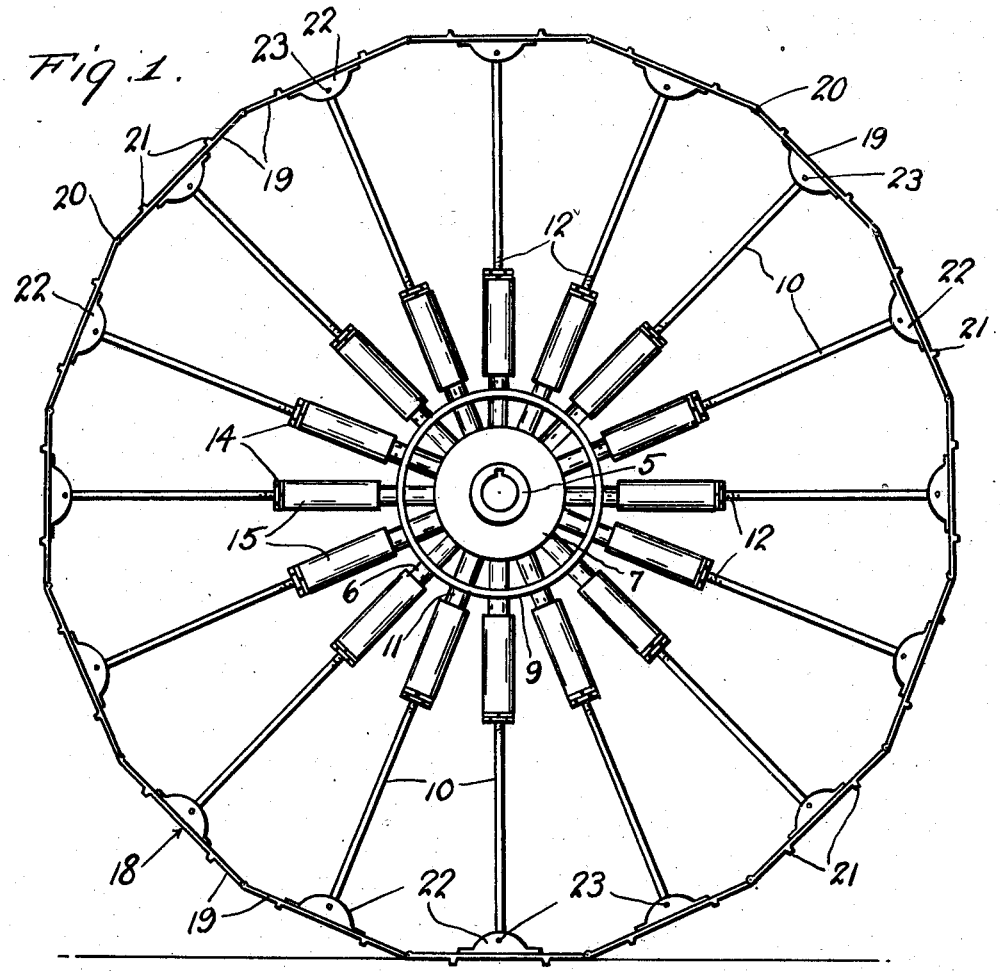
Figure 1 represents a side elevation of the wheel in its entirety.
Figure 2:
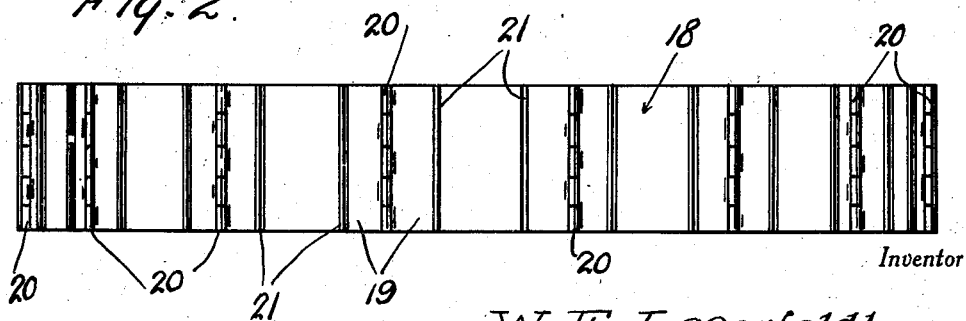
Figure 2 represents an edge elevation thereof.

Referring to the drawings wherein like numerals designate like parts, it will be seen that the present invention embodies a hub structure 5 from which radiate a plurality of guide members 6. These guide members 6 radiate from the periphery 7, at equal spaced intervals. The guide members 6 are also interconnected by the annulus 9, connecting the intermediacies of the guide members 6.

The wheel construction includes a plurality of spoke rods 10, one for each of the guides 6, as well as one for each of the guides 11 which project from the annulus 9, the same being shorter in length than the guides 6. The guides 6 and 11 receive the inner ends of the spokes 10, while the intermediacies of the spokes are adapted as at 12 for receiving the plates 13, as well as the nuts 14.

Figure 3:
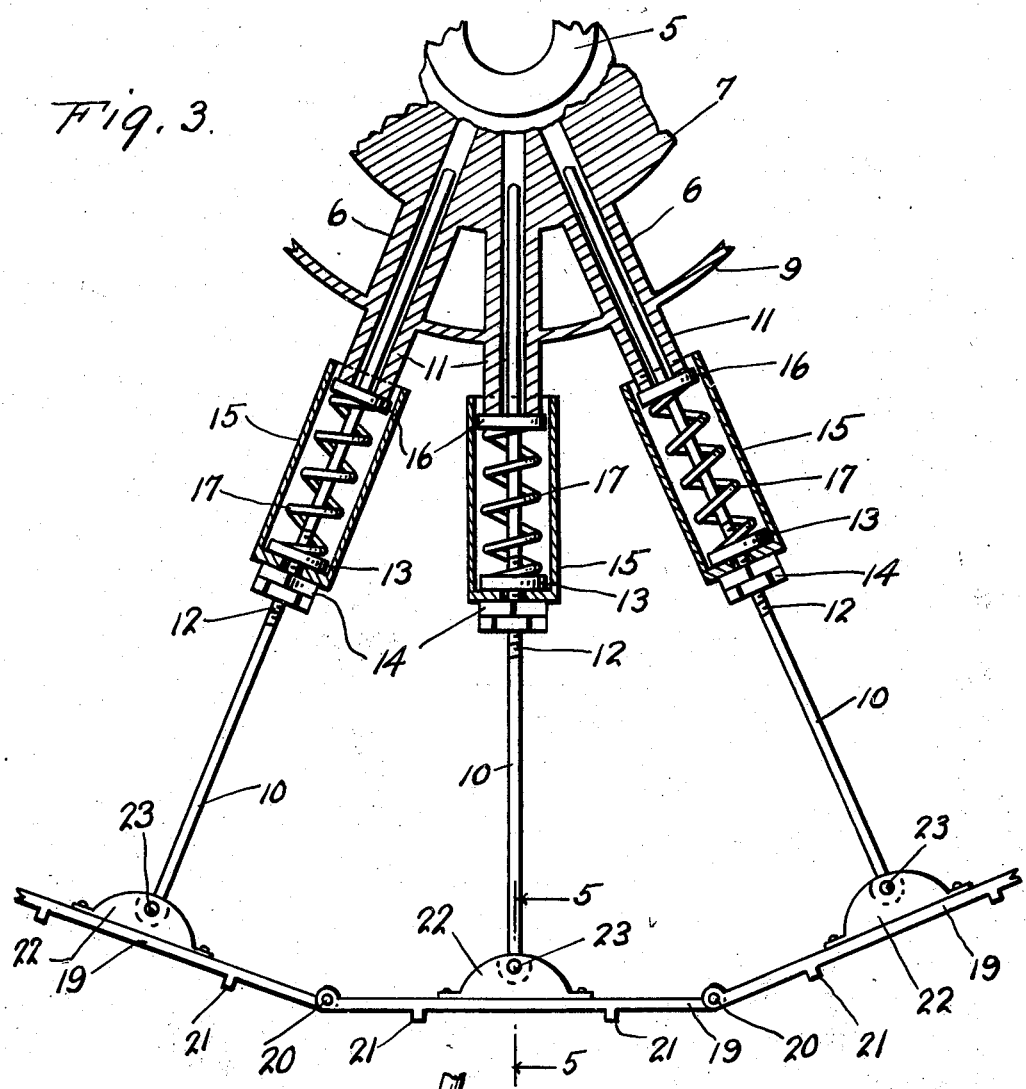
Figure 3 represents a fragmentary vertical sectional view through the improved wheel.
Figure 5:
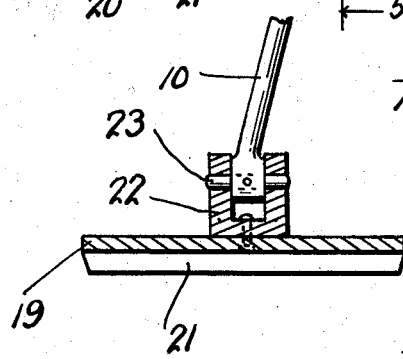
Figure 5 represents a fragmentary vertical sectional view, taken substantially on the line 5—5 of Figure 3.

A cylindrical cover 15 is provided for each spoke and is closed at one end and provided with an opening to receive the spoke 10. This closed end of the cover is adapted to engage the plate 13 at one side and to have the nuts 14—14 jammed against the opposite sides thereof for firmly maintaining the same in a set position on the spoke. The open end of the cover receives the complementary guide, in substantially the manner shown in Figure 3. The plate 16 is provided on each spoke through which the same is slidable and this plate is adapted to abut the free end of the guide. A spring 17 of the compressible type, impinges at one end against the plate 16 and at its opposite end against the plate 13.

A tread annulus generally referred to by numeral 18 and shown in its entirety in Figure 1, consists of a plurality of rectangular shaped plates 19 hingedly connected at their ends as at 20. Each of the plates is provided with a pair of longitudinally spaced and transversely extending cleats 21—21.

A member 22 of U-shaped cross section is secured to the inner side of each section 19 and between the flanges of this member is pivotally connected the outer end of a spoke 10 as at 23.

It will thus be seen that the present invention presents a tractor wheel which is resilient and which, in operation, will perform its duty with more efficiency than is expected of wheels of this character now in use.

Furthermore, while the foregoing description has been in specific terms, it is to be understood that various changes in the shape, size, and materials may be resorted to, without departing from the spirit and scope of the invention as claimed hereinafter.

What is claimed as new is:

A spring wheel of the character described comprising a hub, elongated tubular guides radiating from the hub, a traction rim encircling the hub in spaced relation thereto and comprising a series of flat rectangular hingedly connected rigid plates, a plurality of spokes pivotally connected, at their outer ends to the longitudinal central portions of the plates and having their free ends slidably extending into the guides, circular discs mounted on the spokes in spaced relation to the guides, cylindrical housings mounted on the spokes and extending telescopically over the free ends of the guides, inturned flanges on said housings in engagement with the outer faces of the discs, jamb nuts threaded on the spokes for engagement with the outer faces of the housing flanges for clamping same against the discs, circular discs slidably mounted on the spokes in spaced relation to the first named discs and in engagement with the free ends of the guides, and compressible springs positioned in the housings and encircling the spokes intermediate the circular discs thereon and having their opposite ends engaged with said discs.

In testimony whereof I affix my signature.

WILFRED EMANUEL LAGERFELDT.